E. C. NEWCOMB.
APPARATUS FOR HEATING FLUIDS.
APPLICATION FILED JUNE 26, 1900.

1,008,358.

Patented Nov. 14, 1911.
4 SHEETS—SHEET 1.

Fig. 1.

WITNESSES:
John O Temple

INVENTOR
Edward C. Newcomb
BY
Kenyon & Kenyon
his ATTORNEYS.

UNITED STATES PATENT OFFICE.

EDWARD C. NEWCOMB, OF NORTH SCITUATE, MASSACHUSETTS, ASSIGNOR OF THREE-FIFTHS TO PHILIP VAN VOLKENBURGH, OF NEW YORK, N. Y.

APPARATUS FOR HEATING FLUIDS.

1,008,358.

Specification of Letters Patent.  Patented Nov. 14, 1911.

Application filed June 26, 1900. Serial No. 21,616.

*To all whom it may concern:*

Be it known that I, EDWARD C. NEWCOMB, a citizen of the United States, and a resident of North Scituate, Plymouth county, and State of Massachusetts, have invented certain new and useful Improvements in Apparatus for Heating Fluids, of which the following is a specification.

My present invention relates to the heating of fluids generally, and it has for its especial object to provide apparatus for carrying out the method which is made the subject-matter of a companion application filed contemporaneously herewith, Serial No. 21,617 to which reference is made for a more complete disclosure of such method than appears herein.

More particularly, my present invention has for an object to provide an apparatus by which a supply of a heated fluid may be economically maintained at a uniform temperature, and in the case of a gaseous or expansive fluid at a uniform pressure also, notwithstanding greatly and instantly varying demands upon that supply.

While apparatus designed for various uses, as for heating air or water for domestic or other purposes may be constructed in accordance with my invention, the special object of my invention is to provide an apparatus for the generation of steam or vapor without the employment of any considerable amount of active reserve energy either in the form of a highly heated liquid under great pressure or in the form of a highly heated body of metal or other substance; and, also, to provide an apparatus for which, nevertheless, a supply of steam or vapor may be economically and reliably and positively maintained at a uniform temperature, and preferably in a highly superheated condition, and preferably at a uniform pressure also, irrespective of any demand that may be made on that supply within the capacity of the apparatus, and irrespective of the variations in the demand, and of the suddenness of the variations.

Other objects of my invention are to provide an apparatus of the character referred to, which is automatic in its operation, and easy to control, and yet safe and reliable, even in the hands of inexperienced or careless operators, also one which may be put into active condition without delay, and which is sensibly instantaneous in its ability to accurately adjust itself to greatly varying loads or demands upon it, also one which is efficient in the consumption of fuel and economical in the use of feed water; and to otherwise simplify and render more practical the use of steam, and especially highly superheated steam for power purposes.

My invention consists in the novel apparatus herein described.

The accompanying drawings, which are referred to herein and form a part hereof, illustrate one embodiment of my invention, the form of apparatus shown being particularly designed for the generation of steam or vapor for use in driving engines.

In the drawings in which like reference numerals wherever they occur refer to like parts.

Figure 1:
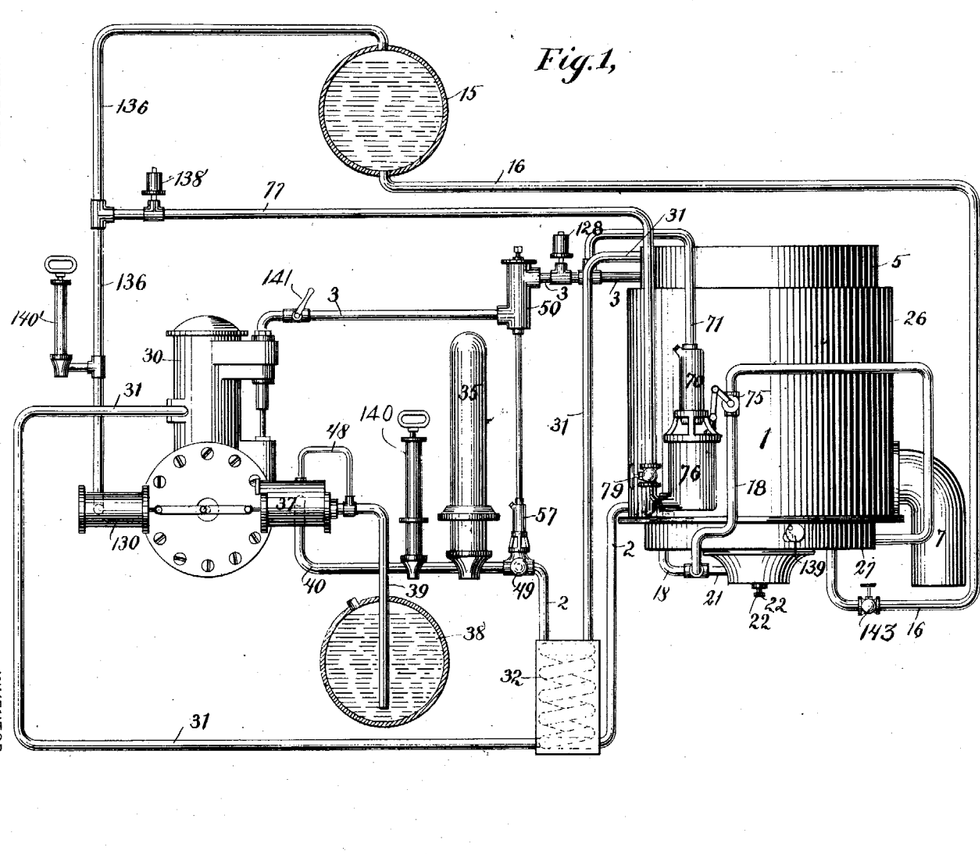
Figure 1 is a diagrammatic view partly in side elevation and partly in section, of the complete apparatus.
Figure 2:
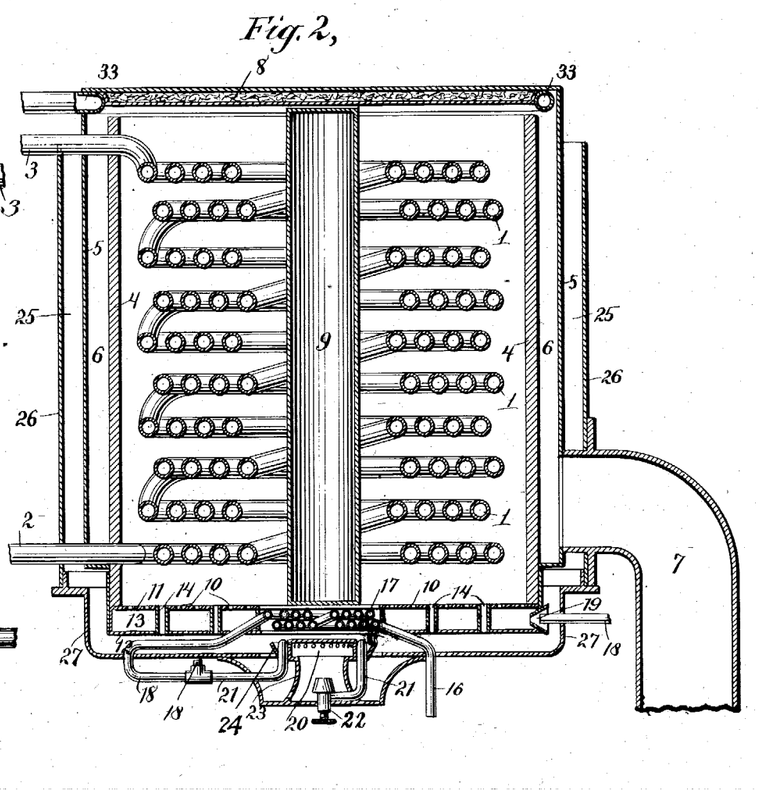
Fig. 2 is a vertical central section of a boiler forming a part of the apparatus.

Referring to the drawings in detail, 1 represents a boiler which should have a large heating surface in proportion to its cubic capacity. As shown in Fig. 2, the boiler comprises a continuous length of pipe 1 of suitable material as drawn seamless steel tubing, which is coiled in a plurality of flat spiral coils arranged in series one above another. The boiler 1 is provided with a feed pipe 2 and a delivery pipe 3. The boiler is arranged in a combustion chamber formed by the cylindrical wall 4 of suitable heat insulating material, as asbestos. The wall 4 of the combustion chamber is inclosed by a cylindrical casing 5, which casing together with the wall 4 forms an annular discharge passage 6 for the products of combustion, which finally find their escape through the chimney 7. The combustion chamber is closed at the top by a suitable heat insulated plate 8 which forms the top of the casing 5. The vertical opening formed by the center of the coils of the boiler is filled by a suitable casing 9 to avoid the formation of a chimney in the combustion chamber, thus compelling the flame to pass upward through the coils, the convolutions of which are preferably staggered as shown, to expose as much surface as possible to the action of the flame. The flame is supplied by a burner 10 arranged at the bottom of the combustion chamber and consisting as shown, of a pair of plates 11 and 12 separated to form a mixing chamber 13 for the gas or vapor and air to be burned. The upper plate 11 is perforated to permit the flow of the mixture of vapor and air from the burner, and suitable passages 14 are provided through the chamber 13 to supply the air necessary to support the combustion.

Fuel in the form of an oil, such as kerosene, is supplied from a suitable reservoir 15 through a pipe 16 to a vaporizing coil 17 located in the vicinity of the burner 10, and preferably in an opening formed in the center thereof, as shown. From the coil 17, the vapor is conveyed through a pipe 18 to a mixer 19, which discharges into the chamber 13 of the burner 10. An auxiliary burner 20 is provided to heat the vaporizing coil 17 and also to act as a pilot light for the burner 10. The burner 20 is supplied with vapor through a branch 21 of the pipe 18, and the flow of vapor to said burner 20 is regulated by a suitable valve 22. Air is mixed with the vapor supplied through valve 22 in a mixing chamber 23 formed by the lower part of the burner 20. The pipe 21 is preferably passed through a trough 24 formed around the top of the burner 20, said trough being adapted to hold a small quantity of combustible fluid, such as naphtha or alcohol which is burned to vaporize the liquid fuel in the pipe 21 when the apparatus is started up.

Where kerosene oil or a similar hydrocarbon is used, it is desirable to heat the air fed to the burners to insure complete combustion and avoid noxious odors. This is done, in the form of apparatus shown, by forming an annular air feed chamber 25 around the casing 5 of the generator. The chamber 25 is formed between the casing 5 and an outer casing 26, 27. The lower casing 27 incloses both burners 10 and 20, and the chamber thus formed supplies the air which is mixed with the vapor in both burners as well as the air which supports the combustion. It will be seen that the chamber 25 not only prevents the formation of noxious odors by heating all the air fed to the burners, but it prevents the objectionable escape of heat from the furnace of the generator to surrounding objects, and it also prevents the flame of the burners from being extinguished or misapplied by the wind or external drafts of air.

In the form of apparatus shown, the steam generated in the boiler is employed for driving an engine 30, which may be of any suitable type, but it preferably is of a type adapted to economically utilize steam in a highly superheated condition, as say at a temperature of from 450 to 550 degrees F. The steam is supplied to the engine through pipe 3, and the exhaust steam is conveyed by a pipe 31 through a feed water heater 32 of any suitable construction, to the combustion chamber of the boiler. The pipe 31 preferably communicates with an annular pipe 33 arranged in the top of the combustion chamber and having a multiplicity of perforations discharging directly into the top of the annular chamber 5, as shown. By reason of this construction, the exhaust steam is intimately commingled with a large volume of the products of combustion immediately upon their leaving the furnace, and sufficient time is given for the particles of steam to become highly superheated or entirely absorbed by the heated air and products of combustion in the chamber 6 so that the exhaust steam will be invisible when discharged from the chimney 7.

Figure 5:
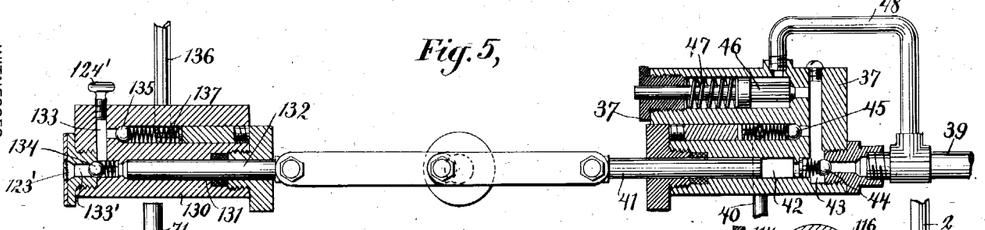
Fig. 5 is a sectional detail view of the pumps forming a part of the apparatus.

An important feature of my invention is found in the manner of feeding the water to the boiler. In the form of apparatus shown in Fig. 1, this feature is accomplished by an air chamber 35 which communicates with the feed pipe 2, and in which a pressure greater than the working pressure of the boiler is maintained. The air chamber 35 may be made sufficiently large to supply water under a practically uniform pressure to feed the boiler for a pre-determined period without recourse to any means for continuously keeping the pressure up, or the pressure in the air chamber may be renewed at intervals by any suitable means as by a hand pump 36. I prefer, however, to provide means for keeping the pressure in said chamber up to a pre-determined uniform amount. The means shown for maintaining the pressure in the air chamber consists of a pump 37 which is continuously operated by the engine 30. This pump is supplied from a tank 38 by a pipe 39, and is connected with the air chamber 35 by a pipe 40. The pump 37 comprises a plunger 41 operating in a cylinder 42. The bore of the cylinder communicates with a valve chamber 43 in which is located an inlet valve 44. The valve chamber 43 communicates with the pipe 40 by a discharge passage in which is located the outlet valve 45. A relief valve 46 also communicates with the valve chamber 43, and said valve 46 is so regulated and controlled by the adjustably confined compression spring 47 that when the pressure in the valve chamber 43 exceeds the desired predetermined amount the relief valve 46 opens and permits the water to escape by the pipe 48 back into the supply pipe 39. The capacity of the pump should be such as to supply the maximum demand for water by the boiler.

Figures 3, 4:
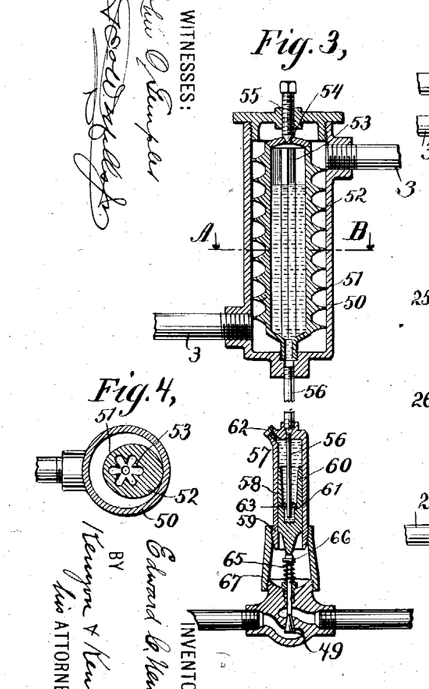
Fig. 3 is a vertical central section of a thermostat used in connection with the apparatus.
Fig. 4 is a transverse section of the same on the line A—B of Fig. 3.

From the chamber 35 water is admitted to the boiler when required through a valve 49, which is normally closed and arranged to be automatically opened whenever the steam issuing from the boiler reaches a predetermined temperature. As shown, this is accomplished by a thermostat consisting of a suitable casing 50 interposed in the steam pipe 3, in which casing is mounted a suitable receptacle 51 constructed to withstand great internal pressure and capable of rapidly transmitting the heat of the steam to a liquid contained therein. The receptacle 51 should be partly filled with a liquid which at atmospheric pressure is vaporized at a much lower temperature than the temperature at which it is desired to deliver the steam from the boiler so that the heat of the steam will produce a very high pressure in the receptacle 51. When it is desired to deliver the steam in a highly superheated condition, water may be used in the receptacle 51. The receptacle 51 may be provided with external ribs 52 and internal ribs 53, or it may be corrugated or otherwise constructed to present a large heating surface both to the steam on the outside thereof and to the water on the inside thereof. The receptacle may be provided with an opening 54 through which it may be refilled, said opening being closed when the device is in use by a screw 55, as shown. The receptacle communicates by means of a pipe 56 with a suitable motor device 57 adapted to operate the valve 49. As shown, this device consists of a piston 58 mounted in a cylinder 59 and arranged to impinge upon and depress the stem of the valve 49. To prevent leakage around the piston 58 under the high pressure created in the thermostat the piston is provided with an elongated tubular rearward extension 60, which accurately fits the interior of the cylinder 59, and the rearward portions of said parts are filled with a very heavy and viscid substance which will not readily leak out around the elongated bearing between the piston 58 and its extension 60 and the bore of the cylinder 59, even under very high pressure. The end of the pipe 56 is extended through the viscid substance in the cylinder into the forward part of the opening in the cylinder, which part of the cylinder is filled with a thinner liquid which will readily flow through the pipe 56. Care should be taken to prevent the two liquids in the device from mixing and to keep them in the proper ends of the device. This may be done by a piston like partition 61, or two liquids which will not mix and which have different specific gravities may be used, and the device so positioned that the lighter liquid will be at the top. For example, the device may be arranged in the position shown, and an oil used for the viscid substance and water for the other. An opening closed by a screw plug 62 may be provided through which to refill the rear end of the chamber when the supply of liquid therein becomes depleted through leakage, and in order to prevent too much of the viscid substance being put into the device the partition 61 is preferably used and a stop 63 is provided, said stop being most conveniently formed by a shoulder on the interior of the tubular section 60 of the piston 58. The stop 63 will efficiently limit the size of the chamber which may be filled with the viscid substance. The device being always filled when the apparatus is inactive and the piston is at the upper limit of its stroke, enough of the viscid substance cannot be forced into the device to interfere with its operation. Where a very thick substance, as paraffin is used, it may be melted to facilitate its insertion into the device. The valve 49 is arranged to be opened by an inward movement of its stem and is, preferably, as shown, of such form that the area of the opening therethrough varies directly with the amount of its movement. The valve 49 is normally closed by a heavy spring 65, which is adjustably confined between a stop 66 on the valve stem and the top of the casing of the valve 49 under such compression that it will hold the valve closed until a very high pressure is developed in the receptacle 51. The cylinder 59 is connected with the casing of the valve 49 by a strong connection 67. It will be seen that the device thus described constitutes a saturated-vapor-tension thermostat, and while other forms of thermostats might be used, this type is preferred on account of its extreme sensitiveness. This sensitiveness is due to the fact that the pressure exerted by a saturated vapor in a closed vessel at high temperatures varies through a wide range with slight variations in the temperature. For example, saturated steam at a temperature of 490° F. exerts a pressure of 665.7 lbs. per sq. in. while at a temperature of 500° F. the pressure is 736.3 lbs. and at 510° F. the pressure is 813 lbs.

It will be seen that the device described will act to very accurately regulate the degree of superheat at which the steam is delivered from the boiler, and that the predetermined temperature will be maintained irrespective of the pressure of the steam in the boiler, and irrespective of the amount of the steam taken therefrom within the capacity of the apparatus. It will be seen, also, that the regulation of the superheat of the steam will be effected by varying the area of the heating surface of the superheating part of the boiler. Thus, supposing the temperature of the steam being delivered at any time is below the desired pre-determined degree. The valve 49 will then be closed by the spring 65 and the quantity of water in the boiler will be reduced by evaporation until the heating surface of the steam space or superheating part of the boiler is so enlarged as to bring the temperature of the steam up to the pre-determined degree of superheat. The valve 49 will then be so operated by the thermostat as to maintain the water in the boiler at the new level as long as the conditions are unchanged. Supposing now, on the other hand, that, through some change in the conditions, the steam flowing from the boiler is too hot. The valve 49 will then be so opened by the thermostat as to increase the quantity of water in the boiler until the heating surface of the steam space is so reduced as to bring the temperature of the steam down to the pre-determined degree of superheat. The valve 49 will then be so operated by the thermostat as to maintain the new level of the vapor producing substance until the conditions are again changed.

Figure 6:
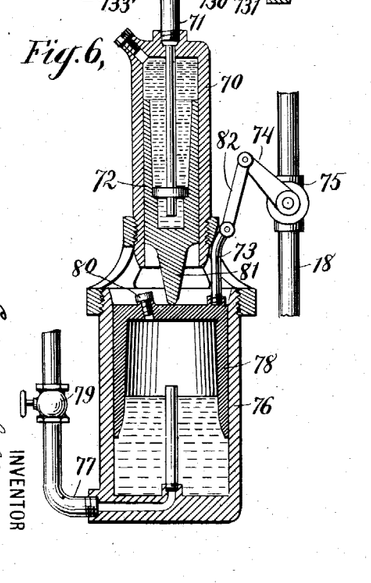
Figs. 6, 7 and 8 are similar views illustrating various forms of the mechanism for automatically regulating the flow of the fuel.
Figures 7, 8, 9:
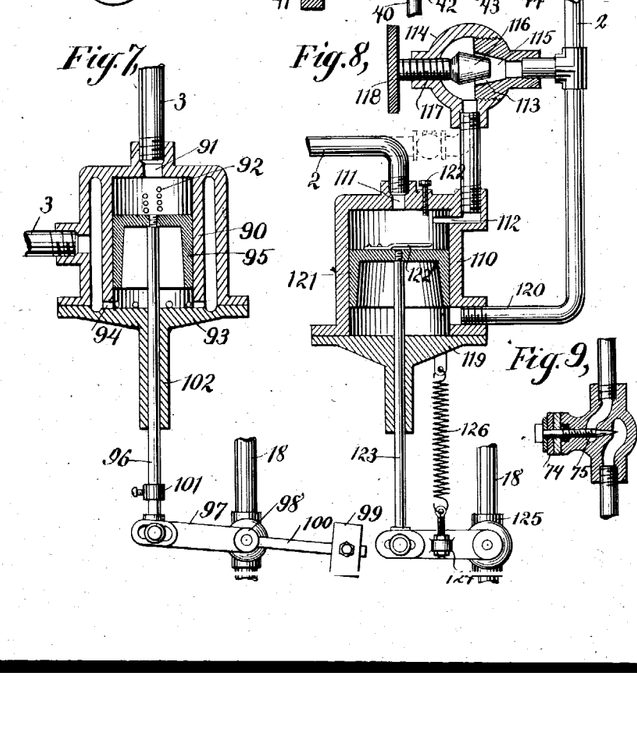
Fig. 9 is a sectional view of a detail.

In order to maintain the steam in the boiler at the desired uniform pressure, however, a proper relation must be maintained between the flow of fuel and the flow of fluid through the boiler, and the manner in which this is done constitutes an important feature of my invention. This is preferably done by utilizing the variations in some state or condition of the fluid in the boiler or of the steam flowing therefrom, or of the water flowing thereto. For example, the differential pressures caused by the flow of the steam or of the water through a restricted passage, or, in a boiler of the type described, the direct variations in the boiler pressure, or variations in the temperature under proper conditions may be resorted to for this purpose. With the apparatus arranged, as so far described, I prefer to regulate the flow of fuel by utilizing for that purpose the direct variations in the pressure of the fluid in the boiler. This is accomplished by the device illustrated in Fig. 6. This device consists of a cylinder 70 which is placed in communication at one end by a pipe 71 with any convenient part of the boiler, as by way of pipe 3. The cylinder 70 may be open at the opposite end. A piston 72 is mounted in the cylinder 70 and is connected in any suitable way as through a piston 78 and a rod 73 with the operating arm 74 of a valve 75 located in the vapor conveying pipe 18. The valve 75 should be so constructed that the area of the opening therein varies directly with the extent of movement of the arm 74. Such a valve is indicated in Fig. 9, in which 75 is a conical valve arranged to coöperate with a correspondingly tapered seat, the valve 75 being moved with relation to its seat, as the arm 74 is turned, by means of an accurately cut thread on its stem, which thread engages a corresponding thread in the valve casing. The piston 72 is impelled toward the closed end of the cylinder 70 by a force which is sensibly uniform and equal to the force exerted on the piston 72 by the fluid pressure in the cylinder 70. This force may be developed in any convenient manner. Preferably, and as shown, it is created by the fluid pressure which is developed, as hereinafter described, to maintain a uniform pressure on the fuel supply. This pressure is communicated to a cylinder 76 through a pipe 77 and is exerted upon a piston 78 mounted in the cylinder 76 and connected to the piston 72, as shown. When the piston 72 is at the inner limit of its stroke and the piston 78 is at the outer limit of its stroke, the valve 75 is fully open.

When steam is drawn from the boiler it will be seen that by reason of the small amount of reserve energy the pressure will immediately fall, free communication to the boiler of the pressure in the air chamber 35 being prevented by the valve 49. This will cause the pistons to move in a direction to open the valve 75, thus admitting more fuel to the burner 10, and the pistons will continue to so move until sufficient heat is supplied to the boiler to produce at a normal temperature and pressure the quantity of steam that is being supplied by the boiler. When the flow of steam from the vaporizer is diminished or stopped, the pressure in the vaporizer will immediately increase and the pistons will move in a direction to diminish the flow of fuel to the burner, and the pistons will continue to so move until the heat developed by the burner is just sufficient to maintain the new flow at the normal temperature and pressure, or if the flow is stopped to keep the pressure in the boiler up to the normal amount. It will thus be seen that when the apparatus is inactive, a small normal flow of fuel will be automatically maintained and that the amount thereof will be automatically regulated. As the pressure in the boiler is dependent upon the pressure which is maintained on the fuel supply, when this form of regulator is used, the areas of the pistons 72 and 78 should bear the proportion that it is desired to maintain between the pressure in the boiler and the pressure on the fuel supply.

In order to prevent the slight irregularities which would occur in the operation of this device as a result of the slight delay in the transmission of the heat through the walls of the boiler, the movement of the pistons should be retarded slightly by some suitable means. I prefer to accomplish this by forming a restricted passage in the pipe leading to one of the cylinders 70 or 76. I have indicated, for this purpose, a valve 79 as located in the pipe 77 leading to the cylinder 76. The valve 79 should be such that the opening therein may be very nicely regulated. If the pistons were not retarded they would move too far during the changes in the load and thus cause fluctuations in the pressure. For example at an increase in demand for steam the pressure would continue to drop after the furnace temperature had been brought up to the required amount to supply the new demand and the furnace temperature would be increased beyond the required amount. Then, when the pressure started to rise it would go beyond the normal degree and cause the pistons to return. During each change of the demand this oscillation or "hunting" of the temperature and pressure would take place. By retarding the operation of the regulating device the pressure will vary through a somewhat wider range during a change but when the furnace temperature has been brought to the required degree the regulator will stop and the "hunting" will be prevented. It will be seen that by the use of this form of regulator uniform pressure will be maintained in the boiler the same for heavy loads as for light loads, and that when the apparatus is inactive it will be automatically maintained in an active condition for an indefinite period, or until the normal pressures on the fuel and water supplies have become dissipated by leakage, or otherwise. In order to avoid leakage in the regulating device the principle of construction adopted in the thermostat motor may be adopted for the pistons 72 and 78, as indicated in Fig. 6. The construction and arrangement used in connection with the piston 72 being precisely the same as that used in connection with piston 58, the description thereof need not be here repeated. Precisely the same construction may also be employed in connection with piston 78, some light liquid being used to convey the air pressure of oil supply tank to the said piston. I prefer to arrange the device vertically, however, and use the air pressure in the cylinder 76 on account of the quickness of action and nicety of control thereby insured. Any of the heavy oil that escapes past the piston 78 will be collected on the top thereof, together with that which leaks past the piston 72 and by opening the filling passage 80 in the top of the piston 78 when the apparatus is in an inactive condition the oil thus collected, if a sufficiently thin oil is used, will run back into the cylinder 76. The pistons 72 and 78 are preferably not secured together. A prolongation 81 of the piston 72 merely rests on the top of piston 78, thus insuring entire freedom from binding in the pistons. The rod 73 is carried by the piston 78 and is secured to the arm 74 of valve 75 by a link 82. By this construction, the open ends of the cylinders 70 and 76 may be brought close together and the device rendered compact.

It will be apparent that this device will operate to maintain a substantially predetermined relation between the supplies of the fluid to be heated and of the fuel for heating the same notwithstanding any variations in the demand for heated fluid within the capacity of the apparatus. As the rate of flow of the water to the generator at any instant is dependent upon the difference in pressure between the supply reservoir 35 and the generator, and as the supply of fuel to the burner is also dependent upon changes of the pressure in the generator, it will be seen that a substantially predetermined relation will be maintained between the effective supplies of water and fuel, this relation being such that the steam will be delivered at a predetermined temperature and pressure at all times notwithstanding the variations of demand for steam.

The flow of the fuel may, if it is desired, be regulated by the flow of fluid through the generator and a predetermined relation between the supplies of the fluid to be heated and the fuel for heating the same thus maintained. In Fig. 7 is illustrated a form of regulator especially adapted to be used in connection with the steam delivery pipe 3. This device consists of a cylinder 90 which communicates through an open port 91 with the pipe 3 leading from the boiler, and through a plurality of longitudinally arranged side ports 92 with the portion of the pipe 3 leading to the engine 30. The end of the cylinder opposite the port 91 is closed by a head 93, and that end of the cylinder is put in communication with the delivery side of the ports 92 by means of one or more ports 94. A piston 95 is fitted to slide freely, but closely in the cylinder 90 and is adapted to cover or uncover the ports 92 successively, and in numbers directly proportioned to the extent of the movement of the piston 95.

The piston 95 is connected by a rod 96 to the operating arm 97 of a valve 98, which may be, and preferably is, of the same construction, as that of the valve 75, and is located in the pipe 18. The piston is impelled in a direction to cover the ports 92 by a constant and uniform force, which may be developed in any convenient way. As shown, this force is produced by a weight 99 which is adjustably mounted on an arm 100 secured to the stem of the valve 98 and extending in a direction opposite to that of the arm 97. The movement of the piston 95 under the influence of the weight 99 may be limited by any suitable means to maintain a small normal flow of fuel when there is no steam being drawn from the boiler. The stop shown consists of an adjustable collar 101 adapted to strike the end of the perforated boss 102 of the cylinder head 93. It follows from this construction that, whenever the pressure exerted on the piston 95 through the port 91 exceeds the pressure on the opposite side of the piston by an amount sufficient to overcome the force of the weight 99 and the friction of the parts, the piston 95 will be so moved as to uncover a sufficient number of the ports 92 to bring the pressure on the opposite side of the piston up so that the difference in the total pressures on the opposite sides of the piston is equal to, and active in a direction opposite to, the force produced by the weight 99. It will thus be seen that a substantially constant and uniform difference in pressure will be maintained on the opposite sides of the piston 95 irrespective of the degree of pressure of the fluid flowing through the device, and irrespective of the amount of the flow, and that the amount of fluid flowing through the ports 92, and consequently through the pipe 3, will be directly proportionate to the number of the ports uncovered. Since the movement of the piston 95 and the opening in the valve 98 produced thereby are directly proportional to the number of ports uncovered by the piston, it follows that the flow of fuel through the valve 98 will be directly proportioned to the flow of fluid through the pipe 3, and that the flow of the one fluid will vary directly as the flow of the other fluid varies, it being understood that the pressure of the fluid flowing through the valve 98 is uniform. A longitudinal slot or a series of longitudinal slots might be provided in place of the multiplicity of successively opened ports 92, but the latter construction is preferred because it gives a constant and invariable distribution of the lines of flow of the fluid passing through the ports 92, thus insuring a flow which is strictly proportional to the movement of the piston. The device shown in Fig. 7 is equally as well adapted to be operated by the flow of water to the boiler as by the flow of steam therefrom.

Figure 10:
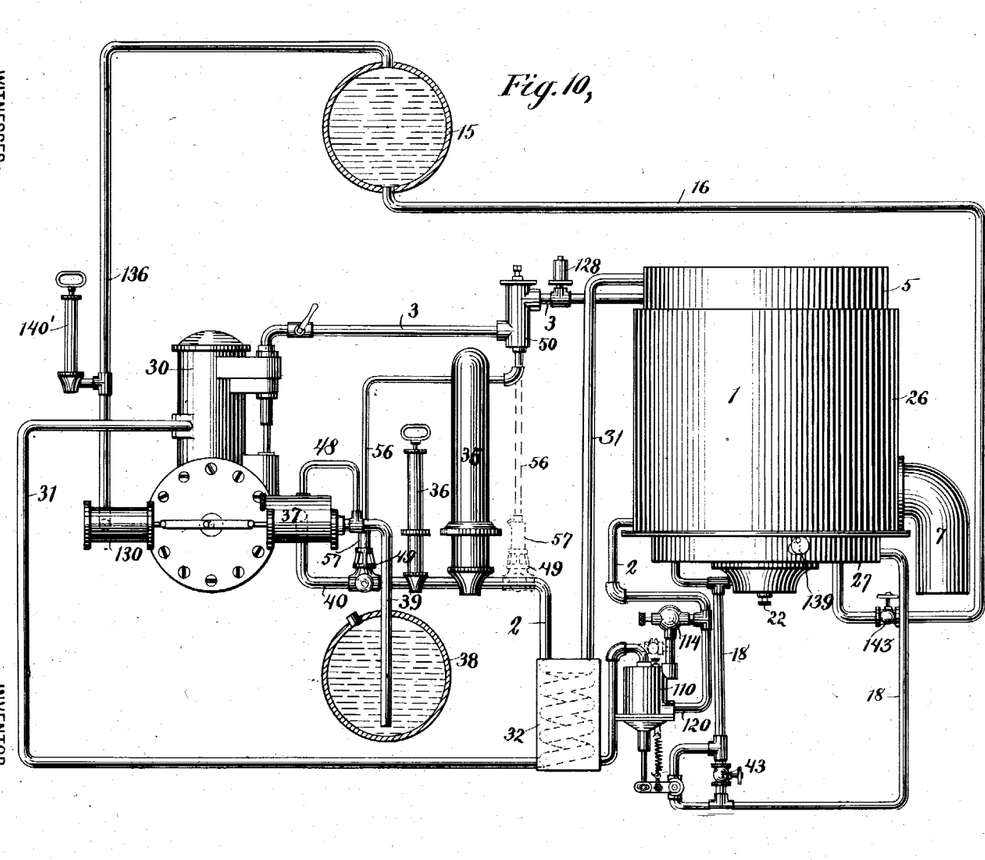
Fig. 10 is a view similar to that of Fig. 1 showing a modified arrangement of the apparatus.

The arrangement of devices for feeding the water to the boiler, shown in Fig. 1, is not adapted to have associated therewith a device for regulating the flow of fuel by the flow of water to the boiler, for, although there is practically a constant stream of water flowing to the boiler when steam is being drawn therefrom owing to the extreme sensitiveness of the thermostat, should the flow of steam, for any reason, exceed the flow of fuel momentarily and the temperature thus get low enough to entirely shut off the flow of water to the boiler, the flow of fuel would also be shut off and the apparatus would become inactive. To overcome this difficulty the valve 49 is located in advance of the chamber 35, or in the pipe 40, as shown in Fig. 10 instead of in the pipe 2. The pressure in the chamber will then correspond to that in the boiler. When this method of feeding water to the boiler is resorted to, and it is desired to regulate the flow of fuel by the flow of water to the boiler, the form of regulating device shown in Fig. 8 is used in preference to the form of device shown in Fig. 7. This device is fully described in its best form in my prior application, to which reference is made for such complete disclosure. Said device consists, as shown, of a cylinder 110 communicating by an end port 111 with the portion of the feed pipe 2 leading from the feed chamber 35 and by a side port 112, which is located near the end of the cylinder 110 having the port 111, with the portion of the feed pipe 2 leading to the boiler. A restricted passage 113 is formed in the last mentioned portion of the pipe 2. This passage 113, as shown, is formed in a casing 114 and between a conical opening 115 therein and a conical plug 116 adjustably mounted by means of the screw stem 117 in the casing 114 in line with the conical opening 115. By means of the milled wheel 118 carried by the stem 117 the area of the restricted passage 113 may be varied, as desired. The end of the cylinder 110 opposite the port 111 is closed by a head 119, and that end of the cylinder is put in communication with the pipe 2 between the restricted passage 113 and the boiler by a pipe 120. A closely fitting, but freely moving piston 121 is mounted in the cylinder 110 and is adapted, when at the limit of its movement, in one direction, to just close the port 112. An adjustable stop 122 may be provided to limit the movement of the piston in that direction, and the piston is preferably provided with a yielding abutment 122' adapted to coöperate with the stop 122. The piston 121 is connected by a rod 123 to the operating arm 124 of a valve 125, which is located in the pipe 18. The piston is normally held at the limit of its movement against the stop 122 by a spring 126, which is adjustably secured at one end to the arm 124, and at the opposite end to the cylinder head 119. The spring should be such that the force required to extend it varies directly with the distance to which it is extended, as, for example, an ordinary spiral spring. The valve 125 is preferably of the same construction as that of valve 75. The ports are nicely fitted to avoid leakage and friction, and the spring 126 is so adjusted as to bring the piston 121 to rest against the stop 122 with certainty but with little force, in which position the valve 125 is nearly closed, enough opening only being left to maintain a small normal flow of fuel to keep the apparatus in active condition. It follows from this construction that whenever the pressure in the boiler falls below the pressure in the air chamber 35, as it does when any steam is drawn from the boiler, the piston 121 will be positively moved from its seat against the stop 122, and an open passage will be formed through the regulating device and the pipe 2, through which the feed water will flow into the boiler at a rate corresponding with the rate of flow of steam from the boiler. The flow of water through the restricted passage 113 will then create a difference in the pressure of the fluid on opposite sides of the passage, which difference in pressure will be proportional to the square of the rate of flow through the passage. This difference in pressure being communicated to opposite sides of the piston 121 will cause a movement thereof, the extent of which movement will be directly proportional to the difference in pressure which causes it, owing to the fact that such movement is controlled by a spring of the character referred to. The piston 121 being connected to the valve 125, as described, the area of the opening in the latter will be directly proportional to the extent of the movement of the piston. The vapor in the pipe 18 in advance of the valve 125 being maintained at a uniform pressure, the pressure between the valve and the vapor nozzle on the burner will vary directly with the opening in the valve. The flow of the fuel to the burner will vary as the square root of this pressure and will thus be regulated to vary simultaneously and directly with the flow of water through the pipe 2 to the boiler, and, the adjustments being correct, just the amount of heat will be created in the combustion chamber to vaporize the water fed to the boiler and heat the steam thus produced to the desired degree of superheat. When the flow of steam from the boiler is diminished or stopped the pressure in the same will instantly rise and diminish or stop the flow of water to the boiler, and the piston 121 will be so moved by the spring 126 as to correspondingly diminish the flow of fuel to the burner, or stop it with the exception of small normal flow, which may be regulated by the stop 122, just sufficient to keep the pressure in the boiler up to the normal amount. If, for any reason, the piston should fail to move under the influence of the spring 126 when the flow of steam is cut off, the resulting increase of pressure in the boiler would create a back flow through the restricted passage 113, and thus cause a reverse difference in pressure on the opposite sides of the piston 121, which would assist the spring 126 to move the same. If the normal flow is so adjusted by the stop 122 as to keep the pressure in the boiler slightly above the normal amount, the back pressure on the piston 121 will act to slightly compress the abutment 122' and thus the normal flow of fuel will be automatically adjusted.

It will be noted that both the devices shown in Figs. 7 and 8 are entirely independent of the degree of the pressure of the fluid flowing through them, being operated solely by the differential pressures created by these devices in the fluid flowing through them. When either of these devices is used in connection with the flow of water to the boiler the pressure therein is preferably regulated by the air chamber 35 and is limited by the relief valve 46 of the pump 37. In practice, the pressure in the air chamber 35 is just enough lower than that maintained in the pump to create a sufficient flow of water through the valve 49 to keep the temperature of the steam issuing from the boiler down to that at which the thermostat 51 is set to operate. When either of the devices illustrated in Figs. 7 and 8 is used in connection with the flow of steam from the boiler, the arrangement last described of the valve 49 may be used. When the arrangement of the valve 49, first described, and shown in Fig. 1 is used, the pressure in the boiler may be prevented from becoming excessive by means of an ordinary relief valve indicated at 128 in Fig. 1. The fuel in the supply reservoir 15 is preferably maintained under a uniform pressure of, say 30 lbs. per square inch, as the flow of fuel may be more accurately regulated under a heavy pressure than under a light one. By this means also, a somewhat higher pressure than usual may be maintained at the vapor nozzle of the mixing tube, thus insuring the right proportions in the mixture of air and vapor without unduly enlarging the mixing device. The pressure on the fuel supply may be maintained by any convenient means. The means shown consists of an air pump 130, which is continuously operated by the engine 30, and preferably by the same crank that operates the feed pump. The pump 130 consists of a cylinder 131, in the bore of which the plunger 132 is continuously operated. The bore of the cylinder 131 communicates with a valve chamber 133, in which is located the spring pressed inlet valve 134. The outlet valve 135 is located in a passage leading from the valve chamber 133 to the supply pipe 136 which communicates with the reservoir 15, and by the branch pipe 77 with the cylinder 76 of the regulating device shown in Fig. 6, when that form of device is employed. The outlet valve 135 is held to its seat by an adjustably retained compression spring 137. The inlet port 133' is preferably provided with a screen 123'. The valve chamber 133 is closed by a screw plug 124' which may be screwed into the chamber more or less to vary the size thereof. It will be seen that the pump 130 will force air into the pipe 136 until the pressure therein, together with the force of the spring 137, equals the maximum pressure that can be created by the displacement of the plunger 132 in the clearance space formed by the chamber 133. The pressure that is maintained in the pipe 136 and the tank 15 may be varied by varying the size of the chamber 133, or by varying the tension of the spring 137, or by varying both said adjustments. An ordinary air pump may, of course, be used in connection with a relief valve indicated at 138 in Fig. 1, but the form of pump described is preferred as by this construction, a pump having an abundant capacity may be employed without waste of energy.

It is to be observed that each of the forms of flow regulating devices shown and described tends to maintain a predetermined relation between the flow of fuel and the flow of fluid through the vaporizer, and that the thermostatic device by acting upon the flow of one of the fluids tends to automatically vary that predetermined relation so that the steam or vapor is delivered at a substantially uniform temperature. In accordance with the invention of this application the thermostatic device is constructed to act on the flow of the liquid to the vaporizer, this being the particular embodiment of the broader invention claimed in my prior application referred to. The degree of the temperature at which the steam or vapor is delivered may be varied by adjusting the tension of the spring 65 which controls the valve 49, or by putting different kinds of fluid in the receptacle 51. By combining the flow regulating and thermostatic devices as described the apparatus is enabled to supply steam uniformly at any desired degree of superheat.

The operation of my apparatus in its various forms when in active condition will be understood from the description that has already been given. It only remains to describe the operation of starting the apparatus up or putting it in active condition. With the apparatus arranged, as first described, and as shown in Fig. 1, a small quantity of naphtha or a similar fluid is poured into the trough 24 through a suitable opening in the casing 27, indicated at 139 in Fig. 1. This liquid being ignited vaporizes the small quantity of fuel remaining from the previous operation in the coil 17 and in the pipe 21. The valve 140 in the oil supply pipe 16 is then opened and the valve 22 is opened sufficiently to maintain the vaporization of the fuel in the coil 17 and pipe 21. A small amount of pressure is then created in the fuel reservoir 15 if none remains from the previous operation. This may be done by any suitable means as by the hand pump 140'. This pressure is communicated to the regulating device and causes the same to hold the valve 75 fully open, thus permitting the full flow of vapor to the burner 10, where it will be ignited by the flame from the auxiliary burner 20. Assuming now that a small quantity at least, of water remains in the boiler from the previous operation thereof, it will be quickly vaporized or part of it will, and a pressure will be created in the boiler which will be proportional to the pressure that has been created on the fuel supply by the pump 140', the regulating device being operated by these pressures the same as by the normal boiler pressure. Assuming that this pressure is sufficient to start the engine 30, and if it is not, it may readily be increased by operating the pump 140, when the engine is started the pump 130 will rapidly bring the pressure on the fuel supply up to the normal amount and, by the operation of the regulator, the boiler pressure will be simultaneously brought up to its normal amount. At the same time the pump 37 will bring the pressure in the air chamber 35 up to its normal amount, and then the apparatus will be in complete operative condition. If it is desired to stop the engine temporarily, it may be done by simply closing the throttle valve 141 and without further attention the apparatus will remain inactive but in an active condition as long as substantially any pressure remains in the reservoir 15. To put the apparatus out of active condition it is only necessary to close the valve 141, and preferably, also the valve 22.

With the apparatus arranged as shown in Fig. 10, whether either form of the regulating device shown in Figs. 7 and 8 is used, and whether the regulating device is arranged to be operated by the flow of water to the boiler or by the flow of steam therefrom, and whether also, the valve 49 is arranged on one side or the other of the chamber 35, the apparatus may be put in operative condition as follows: The auxiliary burner 20 is lighted as before. The vapor is then admitted to the burner 10 by means of a by-pass valve 43, since the valve operated by either of said forms of regulating device is normally closed, and in order to get up steam very quickly a little pressure may be put upon the fuel supply by the hand pump 140' if no pressure remains from the previous operation. As soon as the pressure in the boiler is sufficient to operate the engine, the latter may be started, whereupon the pressure in the chamber 35 will be immediately established, and the by-pass being then closed, the apparatus will be in full operative condition. If the engine is stopped at any time without otherwise manipulating the apparatus, the latter will be rendered inactive, but it will remain in an active condition as long as there is sufficient pressure on the fuel supply to keep the pressure in the boiler up to a degree sufficient to operate the engine. The apparatus may be put out of active condition by closing the valves 140 and 22.

Among the many advantages derived from the use of my invention, the following may be mentioned: An apparatus for generating steam is provided, which is very efficient and flexible in its adaptability to adjust itself to greatly varying loads and which at the same time occupies a small space in proportion to the energy generated, and is absolutely safe, even in the hands of the inexperienced, because little or no reserve energy in the form of a body of highly heated liquid, under great pressure is used, thus avoiding the great danger which accompanies the use of reserve energy in that form. Moreover, the apparatus does not depend on the employment of reserve energy in the form of a highly heated mass of metal, or other substance, thus avoiding the unreliability, lack of economy and short life of the apparatus, which results from the use of reserve energy in that form. My invention avoids also, the inconvenience both as to bulk or weight of apparatus, and as to the lack of adaptability in the same to quickly adjust itself to varying loads, which is inherently associated with active reserve energy in any form. It is to be noted also, that, in the form of apparatus illustrated by way of example in the drawings, the level of the water or other vapor producing substance in the vaporizer is automatically regulated and held at such point as gives the most efficient steam production, having regard to the conditions of pressure and dryness or superheat. Great efficiency in the apparatus also results from the rapidity of circulation of the vapor producing substance in the vaporizer. There is also small liability of calcareous deposits in the vaporizer, owing to the rapidity of circulation therein. Owing, also, to the efficient distribution of the vapor producing substance in the vaporizer and to the accurate regulation of the fuel the vaporizer is not liable to injury from over heating, nor is the machinery liable to injury from the same cause. The apparatus, moreover, requires very little attention and may be left inactive for a considerable space of time without heed, and without getting out of an active condition.

Although my invention in many of its features is useful for many purposes, it is of peculiar value and importance when employed for the generation of steam for power purposes, and particularly in situations where the demand for power varies greatly and the variations are sudden and irregular, as is the case in the propulsion of street cars, automobiles, torpedo boats, launches, etc.

My invention is not confined to the particular form of apparatus shown and described, as many changes and modifications other than those which have been noted may be made therein to adapt it to varying conditions and uses without departing from the principles or scope thereof, and many such changes will readily suggest themselves to those skilled in the art generally, and particularly to those skilled in the particular branch of the art to which the application of my invention is contemplated.

What I claim as new and desire to secure by Letters Patent, is:—

1. In an apparatus for heating fluid, the combination with a receptacle for the fluid to be heated, means for maintaining a supply of the fluid to be heated under a predetermined pressure, means for admitting said fluid to said receptacle, means for supplying a fluid heating agent to heat said receptacle, means tending to maintain a predetermined relation between the flow of the heating agent and the flow of the fluid being heated, and means constructed to control the admission of the fluid to be heated to the receptacle and to be rendered operative by variations in the temperature of the heated fluid, whereby the heated fluid may be supplied at a substantially uniform temperature.

2. In an apparatus for heating fluid, the combination with a receptacle for the fluid to be heated, means for maintaining a supply of the fluid to be heated under a predetermined pressure, means for admitting said fluid to said receptacle, means for supplying a fluid heating agent to heat said receptacle, means for regulating the flow of the heating agent by variations in the pressure of the fluid being heated, and means constructed to control the admission of the fluid to be heated to the receptacle and to be rendered operative by variations in the temperature of the heated fluid, whereby the heated fluid may be supplied at a substantially uniform temperature.

3. In a steam or vapor generator, the combination with a vaporizer and a fluid fuel burner for heating the same, of means for maintaining a supply of liquid to be vaporized under a predetermined pressure, means for admitting said liquid to the vaporizer, means for supplying a fluid fuel to said burner, means tending to maintain a predetermined relation between the flow of the fuel and the flow of fluid through the vaporizer, and means constructed to control the admission of the liquid to the vaporizer and to be rendered operative by variations in the temperature of the vaporized fluid, whereby the steam or vapor may be supplied at a substantially uniform temperature.

4. In a steam or vapor generator, the combination with a vaporizer and a fluid fuel burner for heating the same, of means for maintaining a supply of liquid to be vaporized under a predetermined pressure, means for admitting said liquid to the vaporizer, means for supplying a fluid fuel to said burner, means for regulating the flow of fuel by variations in the pressure of the vaporized fluid, and means constructed to control the admission of the liquid to the vaporizer and to be rendered operative by variations in the temperature of the vaporized fluid, whereby the steam or vapor may be supplied at a substantially uniform temperature.

5. In a steam or vapor generator, the combination with a vaporizer and a fluid fuel burner for heating the same, of means for maintaining a supply of liquid to be vaporized under a predetermined pressure, means for admitting said liquid to the vaporizer, means for supplying a fluid fuel to said burner, means tending to maintain a predetermined relation between the flow of the fuel and the flow of fluid through the vaporizer, and means comprising a saturated vapor-tension thermostat constructed to control the admission of the liquid to the vaporizer and to be rendered operative by variations in the temperature of the vaporized fluid, whereby the steam or vapor may be supplied at a substantially uniform temperature.

6. In a steam generator, the combination with a boiler and a fluid fuel burner for heating the same, of means for maintaining a supply of feed water for the boiler under a pressure greater than that in the boiler, means for admitting the feed water to the boiler, means for supplying a fluid fuel to said burner, means tending to maintain a predetermined relation between the flow of the fuel and the flow of fluid through the boiler, and means constructed to control the admission of the feed water to the boiler and to be rendered operative by variations in the temperature of the steam, whereby the steam may be supplied at a substantially uniform temperature.

7. In a steam generator, the combination with a boiler and a fluid fuel burner for heating the same, of means for maintaining a supply of feed water for the boiler under a predetermined pressure greater than that in the boiler, means for admitting the feed water to the boiler, means for supplying a fluid fuel to said burner, means for regulating the flow of the fuel by variations in the pressure of the steam, and means constructed to control the admission of the feed water to the boiler and to be rendered operative by variations in the temperature of the steam, whereby the steam may be supplied at a substantially uniform temperature.

8. In a steam generator, the combination with a boiler and a fluid fuel burner for heating the same, of means for maintaining a supply of feed water for the boiler under a pressure greater than that in the boiler, means for admitting the feed water to the boiler, means for supplying a fluid fuel to said burner, means for regulating the flow of the fuel by variations in the pressure of the steam such that the flow of the fuel varies directly and in the same degree as the flow of fluid through the boiler varies, and means constructed to control the admission of the feed water to the boiler and to be rendered operative by variations in the temperature of the steam.

9. In a steam generator, the combination with a boiler and a fluid fuel burner for heating the same, of means for maintaining a supply of feed water for the boiler under a pressure greater than that in the boiler, means for admitting the feed water to the boiler, means for supplying a fluid fuel to said burner, means tending to maintain a predetermined relation between the flow of the fuel and the flow of fluid through the boiler, and means comprising a saturated vapor tension thermostat constructed to control the admission of the feed water to the boiler and to be rendered operative by variations in the temperature of the steam, whereby the steam may be supplied at a substantially uniform temperature.

10. In an apparatus for producing superheated steam, the combination with a boiler, a superheater, and a fluid fuel burner for heating said parts, of means for maintaining a supply of feed water for said boiler under a pressure greater than that in the boiler, means for admitting the feed water to the boiler, means for supplying a fluid fuel to said burner, means tending to maintain a predetermined relation between the flow of the fuel and the flow of fluid through the boiler, and means constructed to control the admission of the feed water to the boiler and to be rendered operative by variations in the temperature of the superheated steam, whereby the superheated steam may be supplied at a substantially uniform temperature.

11. In an apparatus for producing superheated steam, the combination with a boiler, a superheater, and a fluid fuel burner for heating said parts, of means for maintaining a supply of feed water for said boiler under a pressure greater than that in the boiler, means for admitting the feed water to the boiler, means for supplying a fluid fuel to said burner, means for regulating the flow of the fuel by variation in the pressure of the steam, and means constructed to control the admission of the feed water to the boiler and to be rendered operative by variations in the temperature of the superheated steam, whereby the superheated steam may be supplied at a substantially uniform temperature.

12. In an apparatus for producing superheated steam, the combination with a boiler, a superheater, and a fluid fuel burner for heating said parts, of means for maintaining a supply of feed water for said boiler under a pressure greater than that in the boiler, means for admitting the feed water to the boiler, means for supplying a fluid fuel to said burner, means for regulating the flow of the fuel by variations in the pressure of the steam, and means comprising a saturated vapor-tension thermostat constructed to control the admission of the feed water to the boiler and to be rendered operative by variations in the temperature of the superheated steam.

13. In an apparatus for heating fluids, the combination with a receptacle for the fluid to be heated, of means for creating a flow of fluid through said receptacle, means for supplying a fluid heating agent to heat said receptacle, means for regulating the flow of one fluid constructed to be rendered operative by variations in the pressure of the other fluid, and means for retarding the operation of said regulating means, substantially as described.

14. In an apparatus for heating fluids, the combination with a receptacle for the fluid to be heated, of means for creating a flow of fluid through said receptacle, means for supplying a fluid heating agent to heat said receptacle, means for regulating the flow of one fluid constructed to be rendered operative by variations in the pressure of the other fluid and to maintain such relation between the flows of said fluids that one varies with the other, and adjustable means for retarding the operation of said regulating means, substantially as described.

15. In a steam or vapor generator, the combination with a vaporizer and a fluid fuel burner for heating the same, of means for supplying the liquid to be vaporized to said vaporizer, means for supplying a fluid fuel to said burner, means for regulating the flow of the fuel constructed to be rendered operative by variations in the pressure of the vaporized fluid, and adjustable means for retarding the operation of said regulating means, substantially as described.

16. In a steam or vapor generator, the combination with a vaporizer and a fluid fuel burner for heating the same, of means for supplying the liquid to be vaporized to said vaporizer, means for supplying a fluid fuel to said burner and to maintain such relation between the flow of fuel and the flow of fluid through the vaporizer that one varies directly and in the same degree as the other varies, means for regulating the flow of the fuel constructed to be rendered operative by variations in the pressure of the vaporized fluid, and adjustable means for retarding the operation of said regulating means, substantially as described.

17. In an apparatus for producing superheated steam or other vapor, the combination with a vaporizer, a superheater, and a fluid fuel burner for heating said parts, of means for supplying liquid to the vaporizer, means for maintaining a supply of fluid fuel for said burner, means for regulating the flow of the fuel constructed to be rendered operative by variations in the pressure of the steam or vapor, and adjustable means for retarding the operation of said regulating means, substantially as described.

18. In an apparatus for producing superheated steam or other vapor, the combination with a boiler having a generating space and a steam space, and a fluid fuel burner for heating both parts of said boiler, of means for regulating the flow of fuel to said burner constructed to be rendered operative by variations in the pressure in said boiler, and adjustable means for retarding the operation of said regulating means, substantially as described.

19. In an apparatus for producing superheated steam or other vapor, the combination with a boiler having a generating space and a steam space, and a fluid fuel burner for heating both parts of said boiler, of means for regulating the flow of fuel to said burner constructed to be rendered operative by variations in the pressure in said boiler, and to maintain such relation between the flow of the fuel and the flow of fluid through said boiler that one varies directly and in the same degree as the other varies, and adjustable means for retarding the operation of said regulating means, substantially as described.

20. A device for maintaining a proportion between the flow of a fluid and the flow of a fluid heating agent for heating the same, comprising a piston motor exposed to the pressure of the heated fluid, means for controlling said motor consisting of a piston exposed to a uniform fluid pressure, means for controlling the flow of the heating agent, and connections between said motor and said controlling means, substantially as described.

21. A device for maintaining a proportion between the flow of a fluid and the flow of a fluid heating agent for heating the same, comprising a piston motor exposed to the pressure of the heated fluid, a piston for controlling said motor, means for maintaining a uniform fluid pressure upon said controlling piston, means for restricting the communication between said controlling piston and the supply of fluid pressure therefor, means for controlling the flow of the heating agent, and connections between said motor and said controlling means, substantially as described.

22. An apparatus for generating superheated steam including in combination, a combined generator and superheater comprising a continuous passage in which the water is gradually heated to the temperature of vaporization, gradually vaporized and superheated, a burner for heating the same, means for supplying water to one end of the generator passage, means for supplying fluid fuel to the burner, means rendered operative by variations in the pressure of the fluid in the generator for varying the supply of one of said fluids, and means rendered operative by the temperature of the superheated steam at a point near the other end of the generator passage for varying the supply of the other fluid, substantially as described.

23. An apparatus for generating superheated steam including in combination, a combined generator and superheater comprising a continuous passage in which the water is gradually heated to the temperature of vaporization, gradually vaporized and superheated, a burner for heating the same, a pump for supplying water to the generator, a pump for supplying a fluid fuel to the burner, means rendered operative by variations in one condition of the fluid in the generator for varying the supply of water, and means rendered operative by variations in another condition of the fluid in the generator for varying the supply of fuel.

24. An apparatus for generating superheated steam including in combination, a combined generator and superheater comprising a continuous passage in which the water is gradually heated to the temperature of vaporization, gradually vaporized and superheated, a burner for heating the same, a pump for supplying water to one end of the generator passage, a pump for supplying a fluid fuel to the burner, means rendered operative by variations in the pressure of the fluid in the generator for varying the supply of fuel, and means rendered operative by variations in the temperature of the superheated steam at a point near the other end of the generator passage for varying the supply of water, substantially as described.

In testimony whereof, I have signed my name to this specification, in the presence of two subscribing witnesses.

EDWARD C. NEWCOMB.

Witnesses:
J. H. FREEMAN,
EDWIN SEGER.